April 26, 1938.   J. GIESEN ET AL   2,115,553
PURIFYING CRUDE METHANOL
Filed July 9, 1935
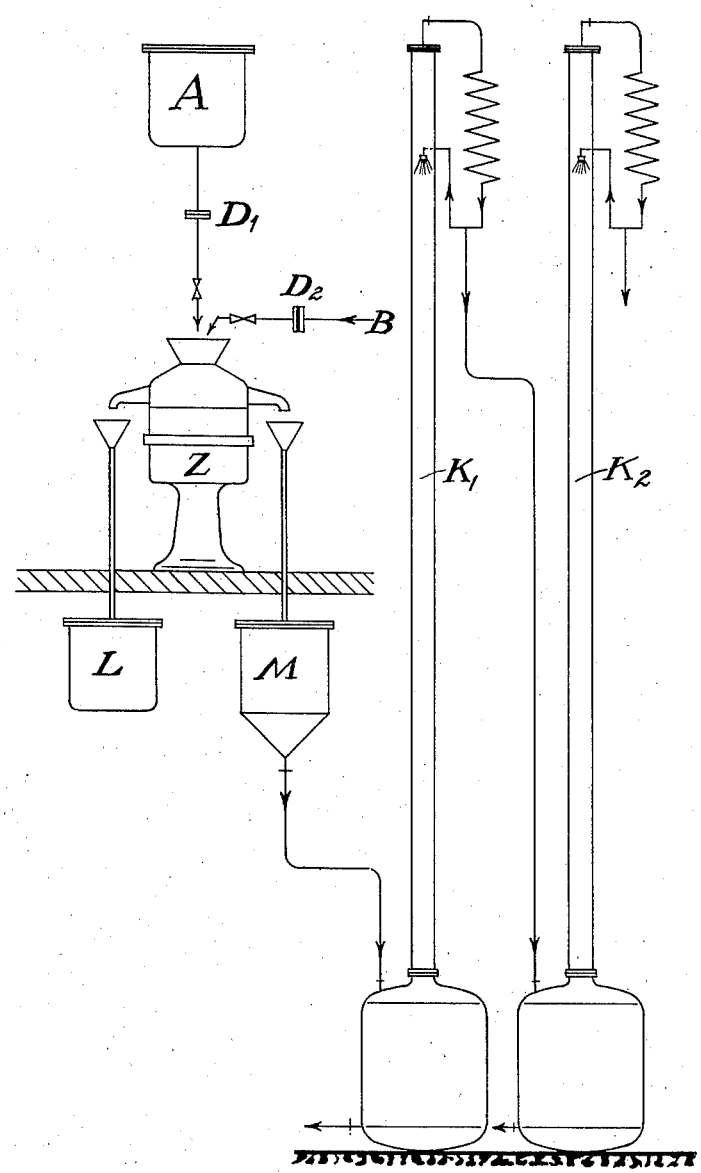
Johann Giesen
Helmut Hanisch
Martin Dally
INVENTORS
BY *Nitz and Jorlin*
ATTORNEYS Patented Apr. 26, 1938

2,115,553

UNITED STATES PATENT OFFICE 2,115,553

PURIFYING CRUDE METHANOL

Johann Giesen, Helmut Hanisch, and Martin Dally, Leuna, Germany, assignors to I. G. Farbenindustrie Aktiengesellschaft, Frankfort-on-the-Main, Germany Application July 9, 1935, Serial No. 30,502
In Germany July 11, 1934

6 Claims. (Cl. 260—156)

The present invention relates to the process of purifying crude methanol.

It is already known that the methanol obtained by the catalytic hydrogenation of carbon monoxide or dioxide under elevated pressure contains certain impurities which cause difficulty in working it up into pure methanol. The impurities cannot be removed by distillation even with the most careful fractionation, although their boiling points are, in part, far higher than that of methanol.

We have now found that the impurities contained in crude methanol obtained synthetically by the catalytic hydrogenation of carbon oxides under elevated pressure can be removed completely in a simple manner by supplying the crude methanol in admixture with water to a rapidly rotating centrifuge and separating after a thorough mixing of the two substances the oily layer formed from the lower layer comprising the methanol and water. The amounts of water employed may be varied within wide limits. Generally speaking comparatively small amounts of water are sufficient, as for example an amount equal to that of the crude material to be purified. The uniting of the water with the crude methanol may take place when they meet in the centrifuge or also previously in any suitable apparatus. The process according to our invention has the advantage that the impurities of the crude methanol which separate in the form of an oil are obtained in a form in which they may be readily isolated and worked up, for example by treatment with hydrogen under high pressures.

The nature of our present invention will be further described with reference to the accompanying drawing which illustrates an arrangement of apparatus for carrying out the process continuously, but this apparatus is only given by way of example and the invention is not restricted thereto.

The crude methanol flows continuously from a reservoir A through measuring means, as for example a choke disc $D_1$, to a centrifuge Z. At the same time water is supplied to the centrifuge Z from a pipe B and is similarly measured by measuring means $D_2$. The centrifuge, as for example a centrifuge of ordinary construction having a speed of 6000 revolutions per minute, is so adjusted that the separation of the liquid into two layers is so sharp that pure oil flows from the outlet for the lighter component into a container L and a mixture of methanol and water free from oil flows from the other outlet.

For the further working up of the said mixture of methanol and water, it flows through a mixer M in which are introduced the necessary reagents for working up the product to pure methanol, as for example potassium permanganate or zinc chloride, preferably in a dissolved form, and is continuously supplied to the distillation columns $K_1$ and $K_2$. The first column effects the separation of the water and other residues from the methanol and the second effects the separation of any first runnings constituents still contained in the methanol.

The following example will further illustrate the nature of our invention and in which manner it may be carried out in practice, but the invention is not restricted to this example.

Example

One part by volume of crude methanol obtained by the catalytic hydrogenation of carbon monoxide under a pressure of say 200 atmospheres and having a bromine value of 300 (determined by adding a solution of 13.5 grams of bromine in 1 liter of 50 per cent acetic acid to 100 cubic centimeters of the crude methanol until a lasting pale yellow coloration is obtained) is mixed with different amounts of water as indicated in the following table and simply allowed to settle. Then the layers formed are separated. The following bromine values have been ascertained, being determined with regard to the methanol contained in the lower aqueous layer:

| Parts by volume of water added to one part by volume of methanol | Bromine value after five minutes | Bromine value after twenty-four hours |
| --- | --- | --- |
| 1 | 52 | 18 |
| 1.25 | 36 | 17.6 |
| 1.50 | 35 | 16.0 |
| 1.75 | 37 | 15.7 |
| 2.00 | 35 | 16.9 |

It is apparent, therefore, that a further increase in the amount of water added is practically without effect and that the separation of the impurities is very incomplete in all cases indicated in the above table.

If on the other hand according to our present invention the same amounts of water are added to the same amount of crude methanol while entering a centrifuge having a speed of 6000 revolutions per minute and the layers formed are separated, the bromine value of the methanol contained in the lower layer effluent from the centrifuge and consisting mainly of methanol and water is only 6. The purification process is much more rapid and also much more far-reaching than in the case of simple sedimentation. The working up of the mixture of methanol and water thus obtained to form pure methanol offers no difficulty.

What we claim is:—

1. The process of purifying crude methanol obtained synthetically by the catalytic hydrogenation of carbon oxides under elevated pressure which comprises mixing crude methanol and water, subjecting the mixture to the action of a centrifuge in order to separate the mixture into an upper oily layer containing the separable impurities and a lower, methanol-water layer and separately removing the liquids of the two layers from the centrifuge.

2. The process of purifying crude methanol obtained synthetically by the catalytic hydrogenation of carbon oxides under elevated pressure which comprises mixing approximately equal parts of crude methanol and water, subjecting the mixture to the action of a centrifuge in order to separate the mixture into an upper, oily layer containing the separable impurities and a lower, methanol-water layer and separately removing the liquids of the two layers from the centrifuge.

3. The process of purifying crude methanol obtained synthetically by the catalytic hydrogenation of carbon oxides under elevated pressure which comprises supplying crude methanol and water to a centrifuge, mixing the methanol and water, subjecting the mixture to the action of the centrifuge in order to separate the mixture into an upper, oily layer containing the separable impurities and a lower, methanol-water layer and separately removing the liquids of the two layers from the centrifuge.

4. The process of purifying crude methanol obtained synthetically by the catalytic hydrogenation of carbon oxides under elevated pressure which comprises continuously mixing crude methanol and water, subjecting the resultant mixture to the action of a centrifuge in order to separate the mixture into an upper, oily layer containing the separable impurities and a lower, methanol-water layer and separately removing the liquids of the two layers continuously from the centrifuge.

5. The process of purifying crude methanol obtained synthetically by the catalytic hydrogenation of carbon oxides under elevated pressure which comprises mixing approximately equal parts of crude methanol and water, supplying the mixture continuously to a centrifuge, subjecting the mixture to the action of the centrifuge in order to separate the mixture into an upper, oily layer containing the separable impurities and a lower, methanol-water layer and separately removing the liquids of the two layers continuously from the centrifuge.

6. The process of purifying crude methanol obtained synthetically by the catalytic hydrogenation of carbon oxides under elevated pressure which comprises mixing crude methanol and water, subjecting the mixture to the action of a centrifuge in order to separate the mixture into an upper, oily layer containing the separable impurities and a lower, methanol-water layer, separately removing the liquids of the two layers from the centrifuge and subjecting the separated methanol-water mixture to fractional distillation.

JOHANN GIESEN.
HELMUT HANISCH.
MARTIN DALLY.